(12) United States Patent
Jha et al.

(10) Patent No.: US 9,730,249 B2
(45) Date of Patent: Aug. 8, 2017

(54) SYSTEMS, APPARATUSES, AND METHODS FOR PROCESSING RANDOM ACCCESS RESPONSE MESSAGES FOR COVERAGE CONSTRAINED DEVICES

(71) Applicant: Intel Corporation, Santa Clara, CA (US)

(72) Inventors: Satish Chandra Jha, Hillsboro, OR (US); Mohammad Mamunur Rashid, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 14/698,105

(22) Filed: Apr. 28, 2015

(65) Prior Publication Data
US 2016/0143059 A1    May 19, 2016

Related U.S. Application Data

(60) Provisional application No. 62/081,899, filed on Nov. 19, 2014.

(51) Int. Cl.
*H04W 74/08* (2009.01)
*H04W 76/02* (2009.01)

(52) U.S. Cl.
CPC ....... *H04W 74/0833* (2013.01); *H04W 76/02* (2013.01); *H04W 74/085* (2013.01)

(58) Field of Classification Search
None
See application file for complete search history.

(56) References Cited

U.S. PATENT DOCUMENTS

| 2013/0034059 | A1 | 2/2013 | Lee et al. |
| 2014/0071930 | A1 | 3/2014 | Lee et al. |
| 2014/0098761 | A1* | 4/2014 | Lee ............. H04W 74/006 370/329 |

(Continued)

FOREIGN PATENT DOCUMENTS

WO    WO-2016081114 A1    5/2016

OTHER PUBLICATIONS

"International Application Serial No. PCT/US2015/055967, International Search Report mailed Mar. 25, 2016", 3 pgs.

(Continued)

*Primary Examiner* — Ricky Ngo
*Assistant Examiner* — Michael Phillips
(74) *Attorney, Agent, or Firm* — Schwegman Lundberg & Woessner, P.A.

(57) ABSTRACT

Disclosed herein are methods, apparatuses, and systems for establishing lightweight communications between different network components. A messaging process is utilized which includes a random access procedure for a user equipment (UE) and an eNodeB, and a messaging sequence comprising a reduced number of messages (compared to a legacy Radio Resource Control (RRC) Connection messaging sequence) exchanged between different nodes of the network to establish a lightweight connection. These messages can be generated using any combination of pre-configured or pre-determined data specific to either the UE or to lightweight communications.

28 Claims, 8 Drawing Sheets

(56) References Cited

U.S. PATENT DOCUMENTS

| | | | |
|---|---|---|---|
| 2015/0078264 A1* | 3/2015 | Han | H04W 74/0833 370/329 |
| 2016/0174256 A1* | 6/2016 | Ratasuk | H04L 43/0829 370/329 |
| 2016/0219622 A1* | 7/2016 | Liu | H04L 5/0089 |
| 2016/0242212 A1* | 8/2016 | Wong | H04W 74/08 |
| 2016/0269163 A1* | 9/2016 | Wong | H04W 72/042 |

OTHER PUBLICATIONS

"International Application Serial No. PCT/US2015/055967, Written Opinion mailed Mar. 25, 2016", 9 pgs.
"Physical Random Access Channel Coverage Enhancement", R1-134303 TSG RAN WG1 Meeting #74bis, Guangzhou, China ZTE, (Sep. 28, 2013), 1-16.
"PRACH for Rel-13 MTC UEs", R1-144842, 3GPP TSG RAN WG1 Meeting #79, RAN WG1 Meeting #79, San Francisco, USA, [Online] retrieved from the internet: http://www.3gpp.org/ftp/tsg_ran/WG1_RL1/TSGR1_79/Docs/R1-144842.zip, (Nov. 8, 2014).
"Technical solutions for PRACH for MTC enhancement", R1-144822, 3GPP TSG RAN WG1 Meeting #79, San Francisco, USA, [Online] retrieved from the internet: http://www.3gpp.org/ftp/tsg_ran/WG1_RL1/TSGR1_79/Docs/R1-144822.zip, (Nov. 8, 2014).

* cited by examiner

SYSTEMS, APPARATUSES, AND METHODS FOR PROCESSING RANDOM ACCCESS RESPONSE MESSAGES FOR COVERAGE CONSTRAINED DEVICES

PRIORITY CLAIM

This application claims the benefit of U.S. Provisional Patent Application Ser. No. 62/081,899, filed Nov. 19, 2014, the entire contents of which are hereby incorporated by reference herein.

TECHNICAL FIELD

Embodiments pertain to wireless communications. Some embodiments relate to user equipment (UE)-eNodeB signaling information.

BACKGROUND

Wireless mobile devices or user equipments (UEs) may communicate with each other using radio access technologies such as the 3GPP Long Term :Evolution ("LTE") Advanced Release 12 (March 2014) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond. Some UEs also may be configured as coverage constrained devices —e.g., low-cost devices with limited coverage and processing capabilities, UEs with coverage constrained operation modes to limit power/resource consumption, etc. Radio Access Networks (RANs) may thereby increase the "coverage" of these devices by adjusting their transmissions; however, legacy communication procedures restrict how transmission characteristics and signal structure can be modified.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
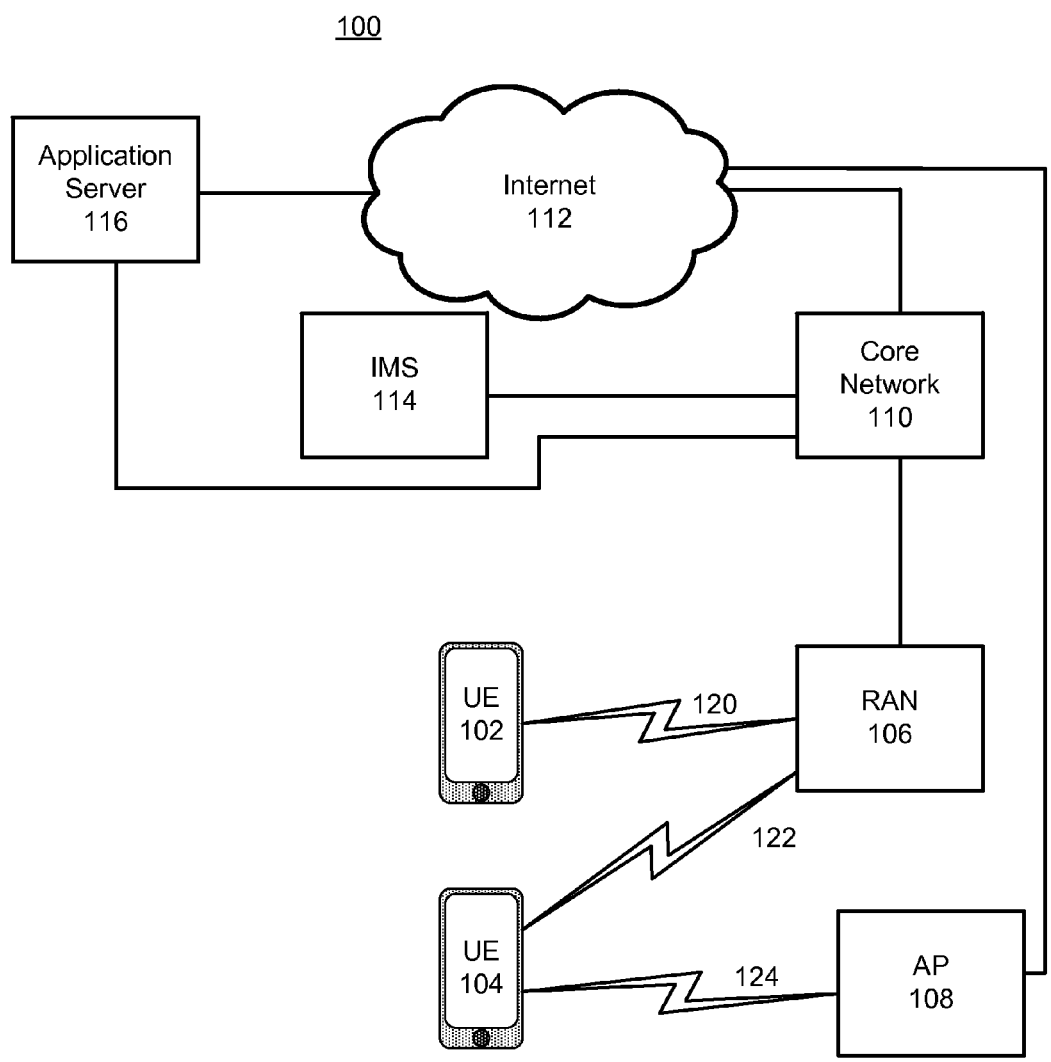
FIG. 1 illustrates an architecture of a wireless network with various components of the network, in accordance with some embodiments.

FIG. 1 illustrates an architecture of a wireless network with various components of the network, in accordance with some embodiments. A system 100 is shown to include a UE 102 and a UE 104. The UEs 102 and 104 are illustrated as smartphones (i.e., handheld touchscreen mobile computing devices connectable to one or more cellular networks), but can also include personal digital assistants (PDAs), pagers, laptop computers, desktop computers, and the like.

The UEs 102 and 104 are configured to access a radio access network (RAN) 106 via connections 120 and 122, respectively, each of which comprise a physical communications interface or layer; in this example, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP LTE protocol, and the like.

The RAN 106 can include one or more access points that enable the connections 120 and 122. These access points (described in further detail below) can be referred to as access nodes, base stations (BSs), NodeBs, eNodeBs, and so forth, and can comprise ground stations (i.e., terrestrial access points) or satellite access points providing coverage within a geographic area (i.e., a cell). The RAN 106 is shown to be communicatively coupled to a core network 110. The core network 110 can be used to enable a packet-switched data exchange with the internet 112 in addition to bridging circuit switched calls between the UEs 102 and 104. In some embodiments, the RAN 106 can comprise an Evolved UMTS (Universal Mobile Telecommunications System)

Terrestrial Radio Access Network (E-UTRAN), and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to the core network 110.

The Internet 112 is shown to be communicatively coupled to an application server 116. The application server 116 can be implemented as a plurality of structurally separate servers or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, PTT sessions, group communication sessions, social networking services, etc.) for UEs 102 that can connect to the application server 116 via the core network 110 and/or the Internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, VoIP, instant messaging (IM), videoconference sessions and video on demand (VoD), and the like.

Figure 2:
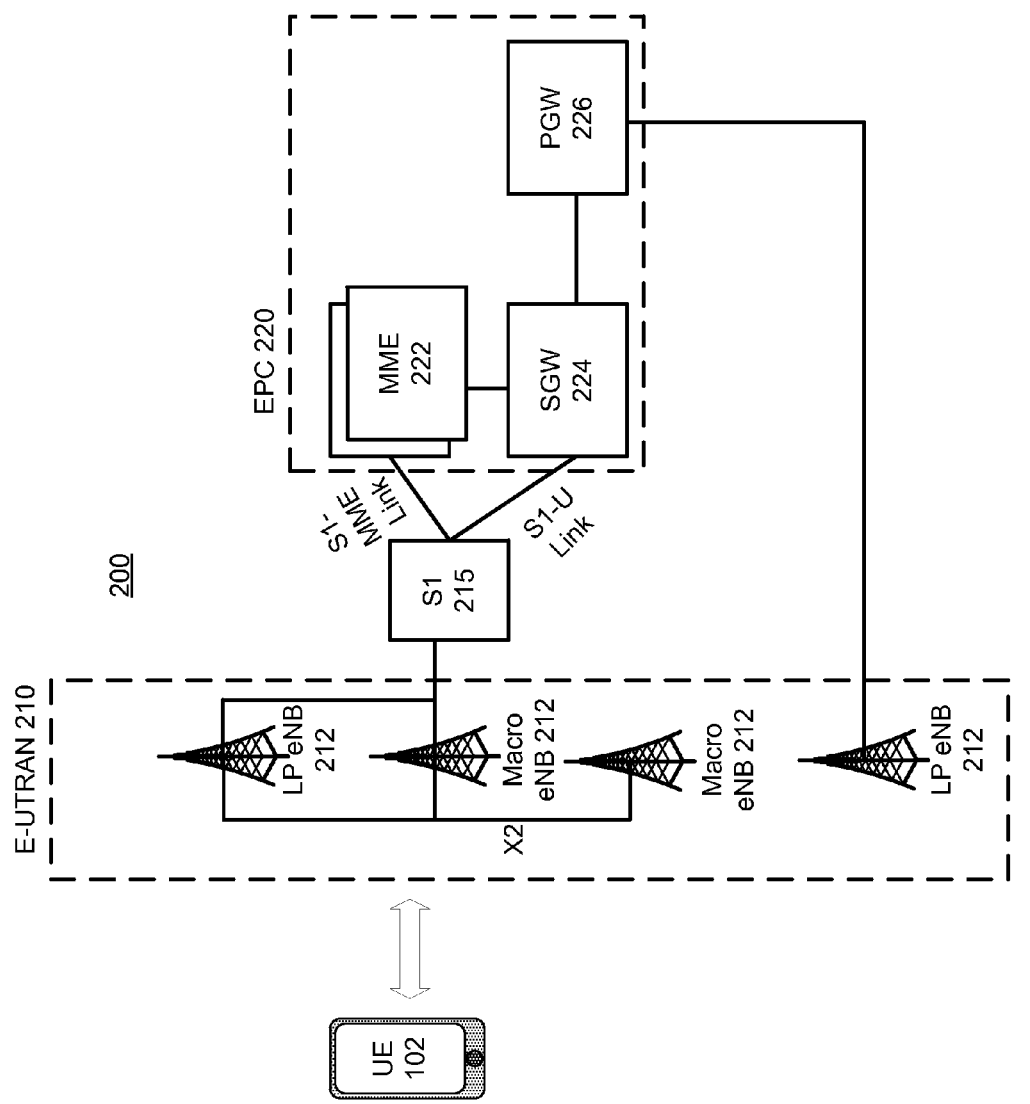
FIG. 2 illustrates an architecture of components of an LTE network, in accordance with some embodiments.

FIG. 2 illustrates an architecture of components of an LTE network, in accordance with some embodiments. In this example, (sub)system 200 comprises an Evolved Packet System (EPS) on an LTE network, and thus includes an E-UTRAN 210 and an EPC network 220 communicatively coupled via an S1 interface 215. In this illustration, only a portion of the components of E-UTRAN 210 and the EPC network 220 are shown. Some of the elements described below may be referred to as "modules" or "logic." As referred to herein, "modules" or "logic" may describe hardware (such as a circuit), software (such as a program driver) or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown, in this example, to include macro eNodeBs and low power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. Any eNodeBs in EPS/LTE networks, such as the eNodeBs 212, do not utilize a separate controller (i.e., an RNC) to communicate with the EPC network 220; in other embodiments utilizing other specification protocols, RANs 106 can include an RNC to enable communication between BSs and core networks.

In accordance with some embodiments, the UE 102 can be configured to communicate using Orthogonal Frequency-Division Multiplexing (OFDM) communication signals with any of the eNodeBs 212 over a multicarrier communication channel in accordance various communication techniques, such as an Orthogonal Frequency-Division Multiple Access (OFDMA) communication technique or a Single Carrier Frequency Division Multiple Access (SC-FDMA) communication technique, although the scope of the embodiments is not limited in this respect. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and the serving gateway (S-GW) 224, and the S1-MME, which is a signaling interface between the eNodeBs 212 and the mobility management entities (MMEs) 222. An X2 interface is the interface between eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low power cells can be used to extend coverage to indoor areas where outdoor signals do not reach well, or to add network capacity in areas with very dense phone usage, such as train stations. As used herein, the term "LP eNodeB" refers to any suitable relatively low power eNodeB 212 for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through the packet data network gateway (PGW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB such as a macro eNodeB through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an AP BS or enterprise femtocell.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the control channel (PDCCH) used for (assigned to) the UE 102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, and a PGW 226. The MMEs 222 are similar in function to the control plane of legacy Serving General packet radio service (GPRS) Support Nodes (SGSN). The MMEs 222 manage mobility aspects in access such as gateway selection and tracking area list management. The S-GW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The S-GW 224 and the MMEs 222 can be implemented in one physical node or separate physical nodes. The PGW 226 terminates an SGi interface toward the packet data network (PDN). The PGW 226 routes data packets between the EPC network 220 and external networks (e.g., the internet 112), and can be a key node for policy enforcement and charging data collection. The PGW 226 and S-GW 224 can be implemented in one physical node or separated physical nodes.

The UE 102 performs cell selection upon power-up and cell reselections throughout its operation. The UE 102 searches for a cell provided by E-UTRAN 210 (e.g., a macro cell or a picocell). During the cell reselection process, the UE 102 can measure reference signal strength for each neighboring cell (e.g., Reference Signal Received Power/ Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC_IDLE. When the UE 102 has data packets to transmit or receive, its RRC state becomes RRC_CONNECTED. The UE 102, when in an RRC_IDLE state, can associate itself to different cells.

In some embodiments, the UE 102 can comprise either a device with constrained coverage capabilities or a device operating in a coverage constrained mode (either type of device may be described herein as a "coverage constrained device"). For example, devices operating primarily for machine type communication (MTC) or machine-to-machine (M2M) communication (e.g., sensor devices, controller devices, etc.) may have limited coverage and/or processing capabilities; similarly, devices may operate in a coverage constrained mode to limit power/resource consumption.

For coverage constrained devices, communications from the eNodeBs 212 may be modified to "enhance" coverage. For example, modifications can include the limitation of some control channel transmissions (e.g., PCFICH, PDCCH), utilizing repetition control techniques for certain control channels (e.g. PBCH, PRACH, (E)PDCCH), and/or specific physical channel formats with repetition for System Information Block (SIB)/Random Access Response (RAR)/ paging.

Figure 3:
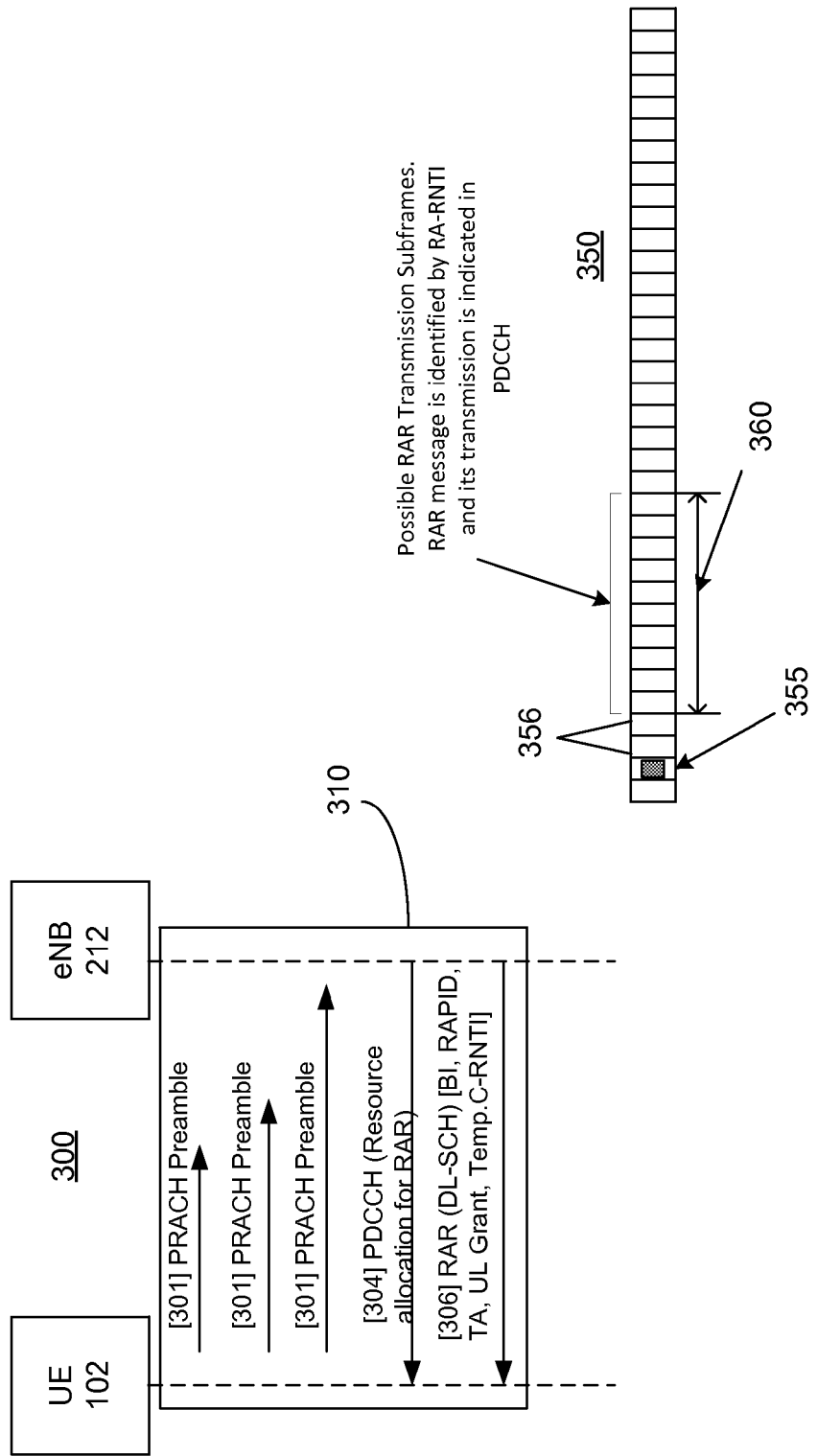
FIG. 3 is an illustration of a process for utilizing legacy-compatible connectivity procedures in accordance with some embodiments.

FIG. 3 is an illustration of a process for utilizing legacy-compatible connectivity procedures in accordance with some embodiments. Process and logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are executed in every implementation. Other process flows are possible.

A messaging sequence 300 comprises a random access procedure for the UE 102 and (any one of) the eNodeBs 212. For the message 301, the UE 102 selects an available physical random access channel (PRACH) preamble; the UE 102 can be notified of available PRACH preambles via the eNodeB 212, as described in further detail below. The UE 102 also gives its own identity to the network (i.e., the E-UTRAN 210 and the EPC network 220) so that network can address it in subsequent messages; this identity may be referred to as the random access radio network temporary identity (RA-RNTI) of the UE 102. In some embodiments, if the UE 102 does not initially receive any response from the network, it increases its transmission power and subsequently re-sends the PRACH preamble message 311 until a response is received.

The eNodeB 212 sends a RAR message 306 to the UE 102 addressed to the RA-RNTI (and also sends a PDCCH resource allocation for the RAR message 304). The RAR message 306 may include a MAC header including a backoff indicator (BI) subheader, a Random Access Preamble Identifier (RAPID) field, and a MAC payload including a timing advance (TA) field, an uplink (UL) grant field, and a temporary cell radio network temporary identity (c-RNTI) field indicating the temporary identity for the UE 102 to use during random access.

FIG. 3 further illustrates a subset of subframes 350 of the messaging sequence 300, according to an embodiment of the disclosure. In this embodiment, the UE 102 monitors the PDCCH for the RAR 306 addressed to the RA-RNTI in the RAR window 360. The start of the RAR window 360 can be determined from the subframe 355 that contains the end of the PRACH preamble transmission 301, plus a subframe gap 356 (shown as two subframes). In this embodiment, the RAR transmission window size can comprise any value between two and ten subframes, although the scope of the embodiments is not limited in this respect.

Thus, in this embodiment, a maximum of ten RAR repetitions can be achieved in the RAR window 360, which may not be sufficient to achieve a significant coverage enhancement (e.g., a coverage enhancement of 15 decibel (dB) may utilize more than 100 repetitions). Coverage constrained devices may comprise low cost devices with limited processing capabilities. These devices, especially devices operating in half-duplex frequency division duplex (FDD) mode, may need longer than two subframes to switch from transmission mode to reception mode. As a result, these devices may not be ready to receive the RAR 306 which can be transmitted starting at subframe 355 (i.e., the third subframe from the subframe 355 where preamble transmission 301 ends).

Furthermore, the location of the RAR message 306 in each subframe of the RAR transmission window 360 is indicated in the PDCCH message 304. Since coverage constrained devices may use several copies of the PDCCH message 304 to decode it, these devices may not be able to know the exact location of the RAR message 306 in a subframe. Therefore, these devices may end up storing the transmission of an entire LTE band in each subframe unless it gets a certain number of PDCCH control message copies for decoding.

Once the PDCCH is decoded, the coverage constrained device knows the location of RAR messages and then processes the RAR portion from the stored transmission of the entire LTE band. Thus, in this embodiment, the location of RAR messages in all repetitions may need to stay in the same order to keep the PDCCH content the same in each subframe. These complications make the RAR repetitions for coverage enhancement highly sophisticated if PDCCH control channels are used to provide location of RAR messages.

Figure 4:
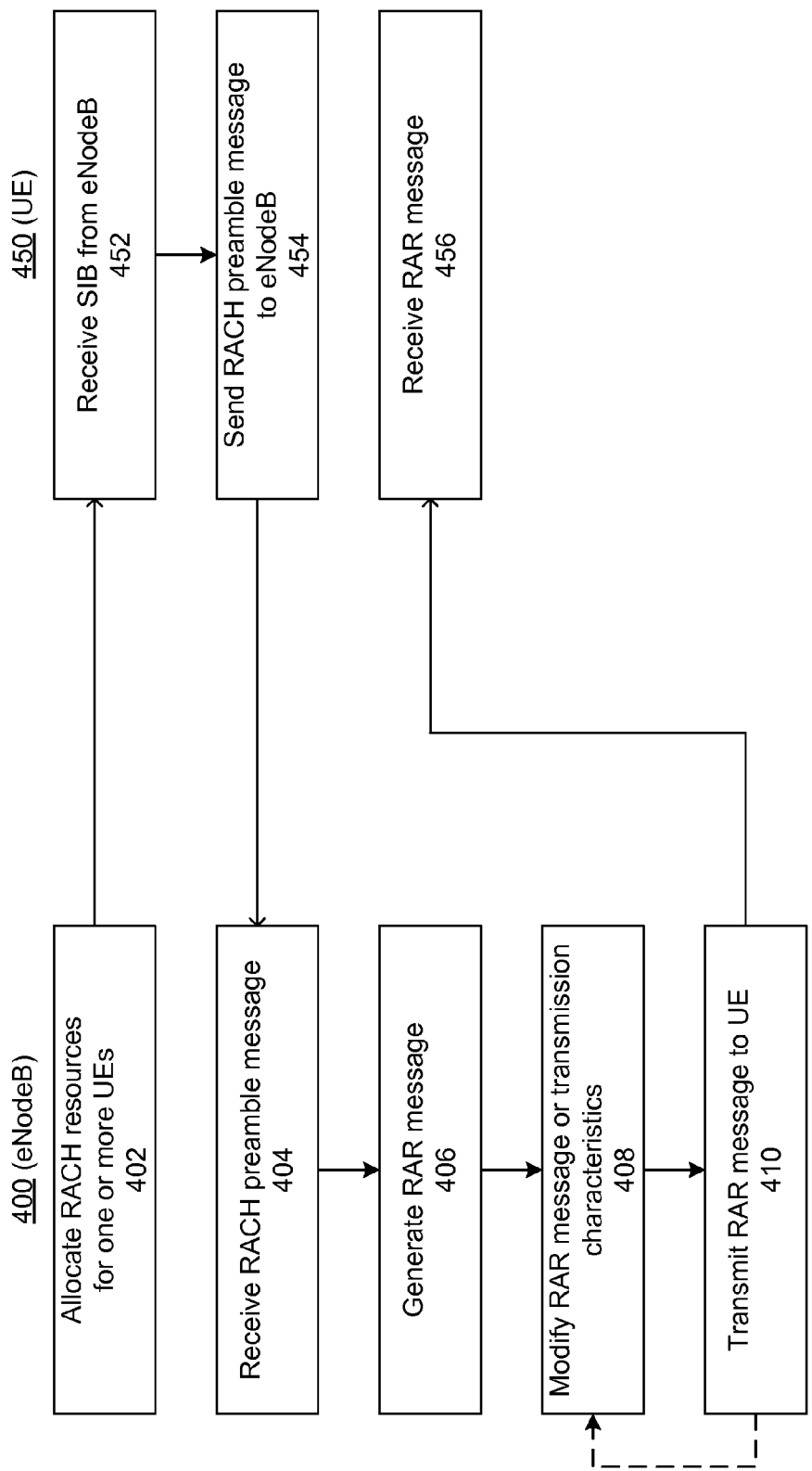
FIG. 4 illustrates processes executed via an eNodeB and a user equipment for coverage constrained devices in accordance with some embodiments.

FIG. 4 illustrates processes executed via an eNodeB and a UE for coverage constrained devices in accordance with some embodiments. Process 400 is a process executed via an eNodeB and process 450 is a process executed via a UE. Process 400 includes executing an operation to allocate RACH resources for one or more UEs (shown as block 402). The eNodeB may send SIBs to UEs (upon UE registration with the associated RAN) that identify allocated RACH preambles, transmission power parameters, message size parameters, etc. In some embodiments, the eNodeB may allocate specific RACH preambles for coverage constrained devices and send these preambles to the respective UEs (provided that the eNodeB receives information identifying a UE as a coverage constrained device). Thus, a UE may be subsequently identified as a coverage constrained device based, at least in part, on its allocated RACH preamble.

Process 450 includes executing an operation to receive the above described SIB transmitted from the eNodeB (shown as block 452). An operation is then executed to send a RACH preamble message to the eNodeB (shown as block 454).

Process 400 includes executing an operation to receive the RACH preamble message from the UE (shown as block 404), and subsequently generate the RAR message (shown as block 406). An operation is then executed to modify either the RAR message or its transmission characteristics to achieve coverage enhancement for the coverage constrained UE (shown as block 408).

To achieve coverage enhancement for coverage constrained devices, broadcast messages such as RAR messages may need to be repeated up to hundreds of times. Furthermore, in legacy connectivity procedures, each transmission of the RAR message also has an associated PDCCH transmission which makes the coverage enhancement highly resource inefficient and complicated for these procedures.

Embodiments may provide coverage enhancement by modifying RAR transmissions (shown in block 408). As discussed above, in some embodiments, the eNodeB may allocate specific RACH preambles for coverage constrained devices. Thus, when the eNodeB receives a RACH preamble message (e.g., block 404), the eNodeB may determine the UE is a coverage constrained device from the received preamble, and modify the transmission of the RAR message accordingly.

Figure 5:
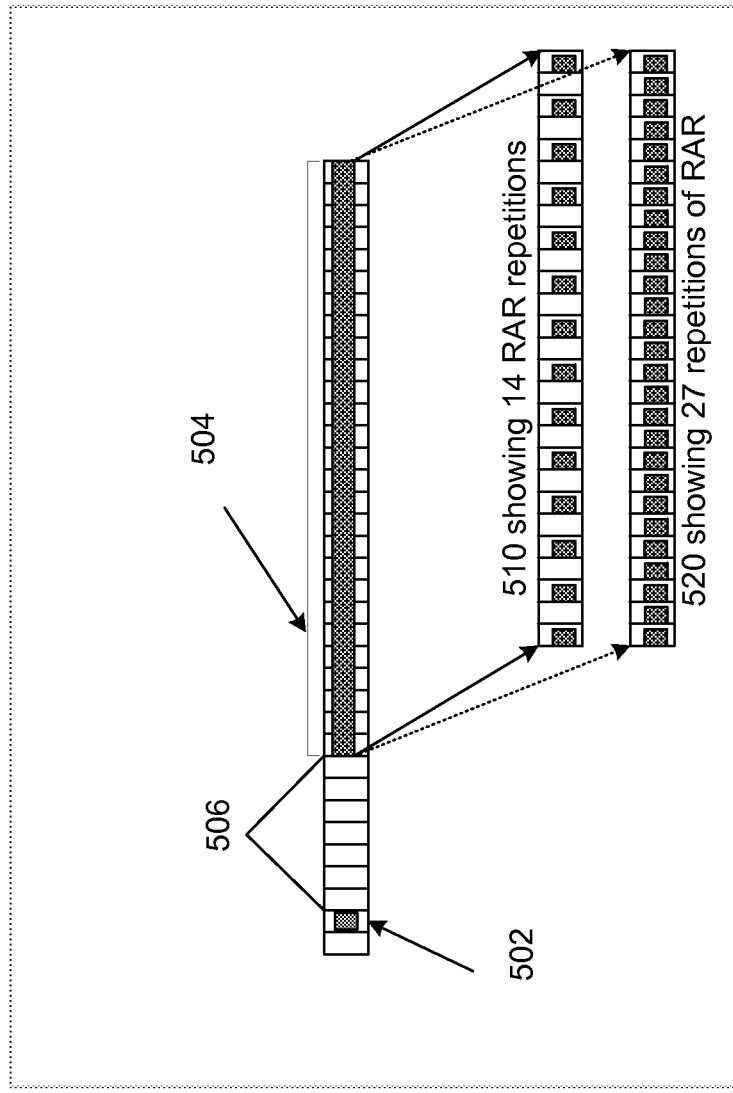
FIG. 5 is an illustration of a random access response transmission window in accordance with some embodiments.

FIG. 5 is an illustration of a RAR transmission window in accordance with some embodiments. In this embodiment, a RAR transmission window 504 is shown subsequent to a subframe 502, where the RA preamble transmission ends, and a subframe gap 506.

As discussed above, coverage constrained devices may be low cost devices with limited processing resources and/or operating in half-duplex FDD mode, and thus may have a longer transition time (more than 2 subframes) to switch between transmit and receive modes. Thus, in this embodiment, the subframe gap 506 comprises a longer time gap between the end of transmission of the RA preamble (i.e., the subframe 502) and the beginning of RAR window 504 than that comprised by the subframe gap used in legacy connectivity procedures (e.g., the subframe gap 356 of FIG. 3). The subframe gap 506 may be configured by the eNodeB based on the latency tolerance and processing capabilities of coverage constrained devices, and thus different times may be defined for various categories of MTC devices/applications.

In addition to the subframe gap 506, enhancing the coverage of a RAR transmission may comprise more than ten repetitions of the RAR message. Thus, compared to the RAR window 360 of FIG. 3, the RAR window 504 may comprise a larger number of subframes to include more than ten RAR message repetitions. RAR transmission configuration 510 is shown to include a plurality of alternating repetitions, while RAR transmission configuration 520 is shown to include consecutive repetitions. The number of repetitions in the RAR window 504 may vary based on the intended db enhancement (e.g., a 15 db enhancement may utilize hundreds of repetitions; a lower value enhancement may utilize fewer repetitions). Furthermore, the size of RAR window 504 may be determined based on the intended db enhancement.

Furthermore, in some embodiments, the RAR transmission does not include a PDCCH transmission; in other words, RAR messages are transmitted at locations within the RAR window 504 which may be determined based on the preamble selected by (or allocated to) the coverage constrained UE. In order to reduce the collisions among RAR transmissions from coverage constrained devices, the resources/locations of RAR transmission for various preambles may be made different.

In other embodiments, a set of preambles is not specified for coverage constrained devices, so the eNodeB does not know that a device is coverage constrained when it receives the RA preamble from the device.

Figure 6:
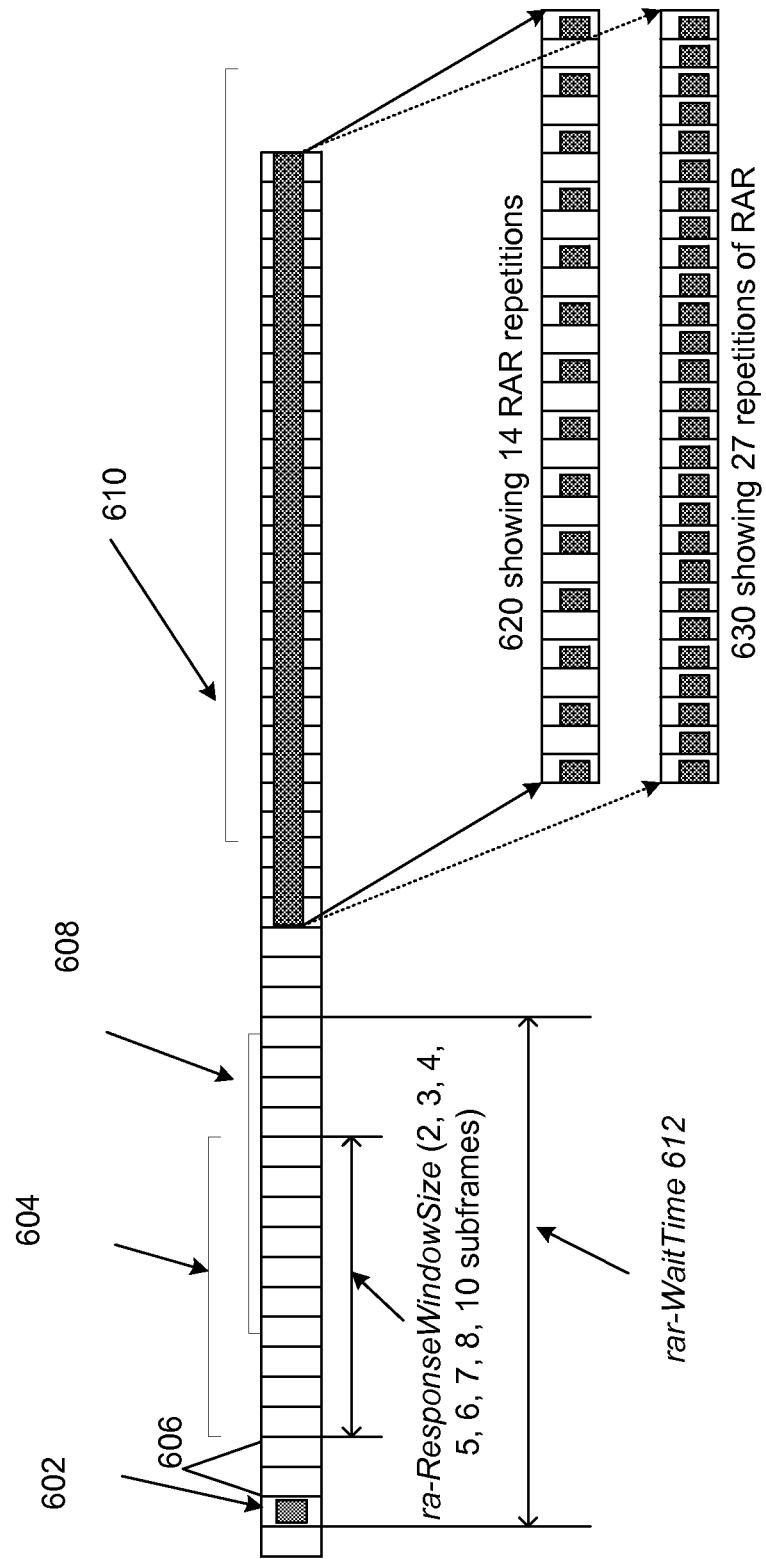
FIG. 6 is an illustration of a random access response transmission window in accordance with some embodiments.

FIG. 6 is an illustration of a RAR transmission window in accordance with some embodiments. In this embodiment, during the time eNodeB receives the RA preamble, the eNodeB does not know that a coverage constrained device is making the access request. Similar to the RAR transmission illustrated in FIG. 3, a first RAR transmission window 604 begins subsequent to the subframe 602 where the RA preamble ends (plus the two-subframe gap 606). The first RAR transmission window 604 is configurable from two-to-ten subframes.

The eNodeB may send a RAR in the first RAR window 604. If the UE is not a coverage constrained device, it may be presumed to respond to eNodeB by sending data or a Buffer Status Report (BSR) in the uplink grant resource 608 indicated in the RAR (in this example, the uplink grant resource 608 may be for the fourth subframe from the subframe of RAR reception). the eNodeB does not receive a response from the UE, it may assume that the device is a coverage constrained device. Multiple copies of RAR messages are then transmitted after a predetermined time (e.g., rar-WaitTime) 612 from the subframe 602 where the preamble transmission ends. For example, rar-WaitTime>=3 (the wait time between the preamble transmission and the start of the ra-ResponseWindow)+10 (the Maximum existing ra-ResponseWindowSize) +4 (the uplink grant in the RAR for the 4th subframe after the end of the maximum existing ra-ResponseWindowSize). After rar-WaitTime 612, the copies of RAR messages may be transmitted after at start of the next ra-ResponseWindow (3 subframes). In some embodiments, rar-WaitTime is known to both the coverage constrained UE and the eNodeB. The value of rar-WaitTime may be selected by the eNodeB such that RAR transmission for the coverage constrained device starts only after making sure the device is not a regular device to save resources and reduce resource wastage.

In this embodiment, the RAR repetition window 620,630 may comprise a larger number of subframes to include more than ten RAR message repetitions, followed by an uplink grant period 610 corresponding to the RAR repetition window, RAR transmission configuration 620 is shown to include a plurality of alternating repetitions, while RAR transmission configuration 630 is shown to include consecutive repetitions. The number of repetitions may vary based on the intended db enhancement (e.g., a 15db enhancement may utilize hundreds of repetitions, a lower value enhancement may utilize less repetitions). Furthermore, the size of the RAR repetition window 620,630 may be determined based on the intended db enhancement.

Referring back to FIG. 4, an operation is executed for the eNodeB to transmit the RAR message according to the above described modifications (shown as block 410). An operation is executed for the UE to receive the RAR message accordingly (shown as block 456). The coverage constrained UE attempts to locate the RAR only in the resource locations determined based on the RACH preamble the UE selected in block 454. The RAR resources/locations are known to the coverage constrained device based on the selected preamble, so the PDCCH control channel is not used in order to get the RAR message location. The RAR message is transmitted several times based on the coverage enhancement needed and the locations/resources for each transmission are known to coverage constrained device. The resources/locations for RAR messages may be made different for various random access preambles selected to reduce the collision among coverage constrained devices which have selected different preambles at the same or nearby times.

Figure 7:
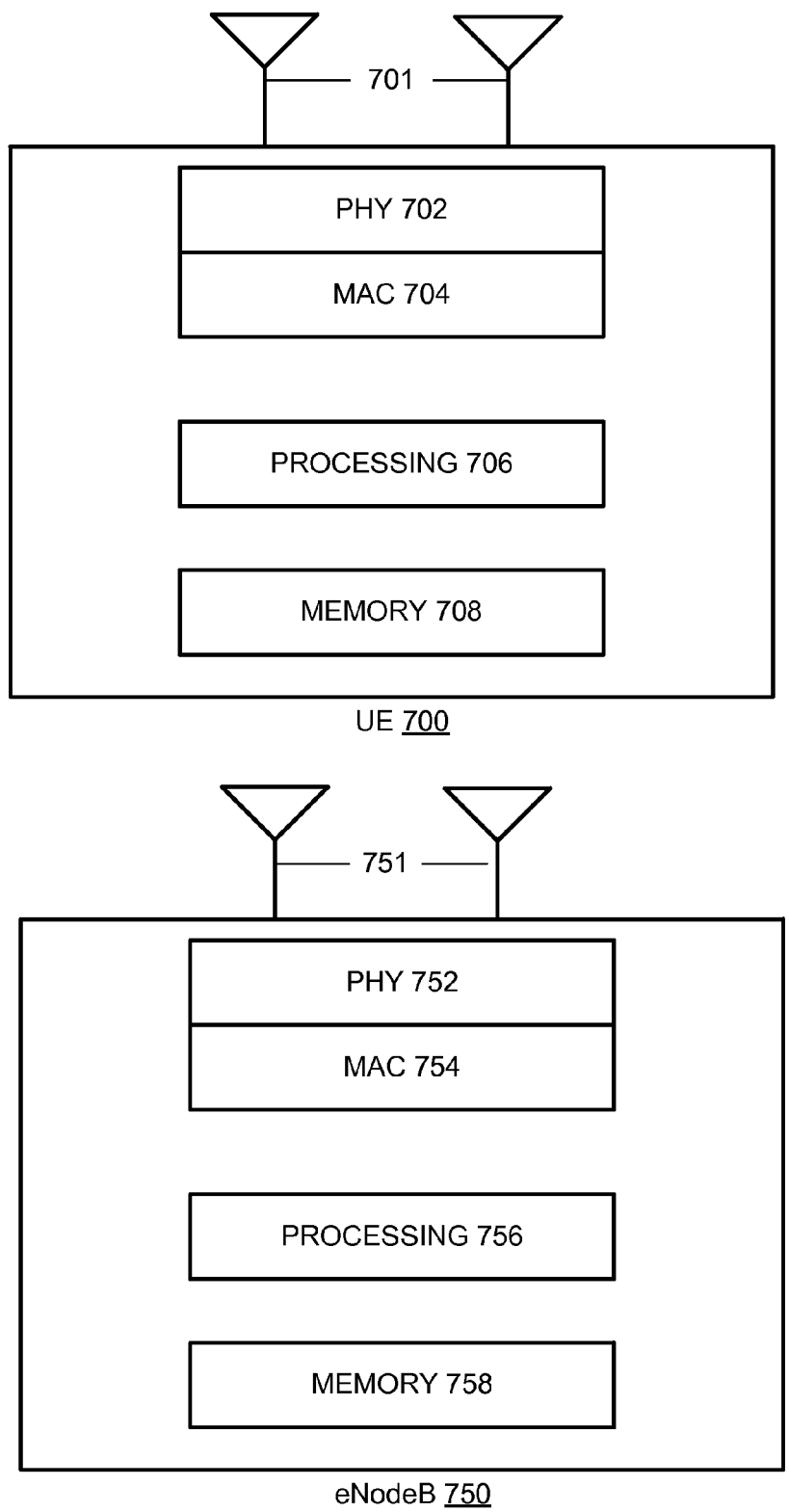
FIG. 7 shows a block diagram of a user equipment and an eNodeB in accordance with some embodiments.

FIG. 7 shows a block diagram of a UE 700 and an eNodeB 750, in accordance with some embodiments. It should be noted that, in some embodiments, the eNodeB 750 can be a stationary non-mobile device. The UE 700 can include physical layer circuitry 702 for transmitting and receiving signals to and from the eNodeB 750, other eNodeBs, other UEs, or other devices using one or more antennas 701, while the eNodeB 750 can include physical layer circuitry 752 for transmitting and receiving signals to and from the UE 700, other eNodeBs, other UEs, or other devices using one or more antennas 751. The UE 700 can also include medium access control layer (MAC) circuitry 704 for controlling access to the wireless medium, while the eNodeB 750 can also include MAC circuitry 754 for controlling access to the wireless medium. The UE 700 can also include processing circuitry 706 and memory 708 arranged to perform the operations described herein, and the eNodeB 750 can also include processing circuitry 756 and memory 758 arranged to perform the operations described herein.

The antennas 701, 751 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 701, 751 can be effectively separated to benefit from spatial diversity and the different channel characteristics that can result.

Although the UE 700 and eNodeB 750 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry 756 for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

Figure 8:
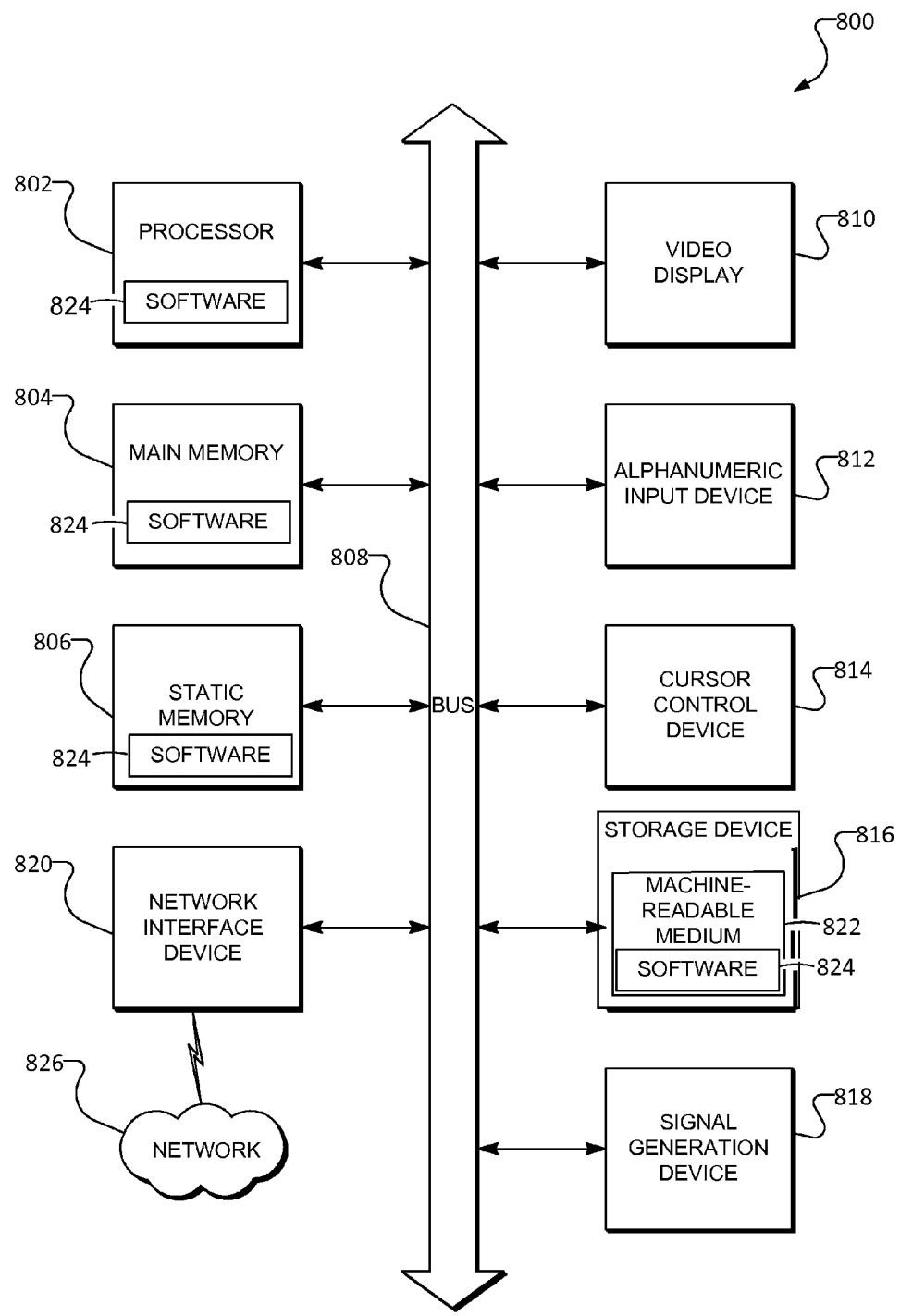
FIG. 8 is a block diagram illustrating components of a machine, according to some example embodiments, able to read instructions from a machine-readable medium and perform any one or more of the methodologies discussed herein, according to aspects of the disclosure.

FIG. 8 is a block diagram illustrating components of a machine, according to some example embodiments, able to read instructions from a machine-readable medium and perform any one or more of the methodologies discussed herein, according to aspects of the disclosure. In particular, FIG. 8 illustrates an exemplary computer system 800 (which can comprise any of the network elements discussed above) within which software 824, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 800 can function as any of the above described UEs or eNodeBs, and can be a personal computer (PC), a wearable mobile computing device, tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a LCD or a cathode ray tube (CRT)). The computer system 800 also includes an alphanumeric input device 812 (e.g., a keyboard), a user interface navigation (or cursor control) device 814 (e.g., a mouse), a storage device 816, a signal generation device 818 (e.g., a speaker), and a network interface device 820.

The storage device 816 includes a non-transitory machine-readable medium 822 on which is stored one or more sets of data structures and software 824 embodying or utilized by any one or more of the methodologies or functions described herein. The software 824 can also reside, completely or at least partially, within the main memory 804 and/or within the processor 802 during execution thereof by the computer system 800, with the main memory 804 and the processor 802 also constituting non-transitory, machine-readable media 822. The software 824 can also reside, completely or at least partially, within the static memory 806.

While the non-transitory machine-readable medium 822 is shown in an example embodiment to be a single medium, the term "machine-readable medium" can include a single medium or multiple media (e.g., a centralized or distributed database, and/or associated caches and servers) that store the one or more software 824 or data structures. The term "machine-readable medium" shall also be taken to include any tangible medium that is capable of storing, encoding, or carrying instructions 824 for execution by the machine and that cause the machine to perform any one or more of the methodologies of the present embodiments, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory including, by way of example, semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 824 can further be transmitted or received over a communications network 826 using a transmission medium. The software 824 can be transmitted using the network interface device 820 and any one of a number of well-known transfer protocols (e.g., HyperText Transfer Protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software 824.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Some embodiments describe an eNodeB comprising transceiver circuitry configured to receive a random access channel (RACH) message from a user equipment (UE), the RACH message including a RACH preamble, and to transmit a random access response (RAR) message to the UE according to a modified transmission parameter, and processing circuitry configured to identify the UE as a device operating in a coverage constrained mode or a device comprising coverage constrained capabilities based, at least in part, on the RACH preamble, and generate the RAR message including the modified transmission parameter in response to the received RACH message, the modified transmission parameter to comprise at least one of a transmission repetition quantity for the RAR message, or downlink subframe resource elements allocated for the RAR message.

In some embodiments, the modified transmission parameter comprises the downlink subframe resource elements allocated for the RAR message, and the processing circuitry is further configured to change one or more of the downlink subframe resource elements allocated for the RAR message for a repeat transmission of the RAR message.

In some embodiments, the processing circuitry is further configured to identify the UE as requesting a machine-type-communication (MTC) connection, and the modified transmission parameter comprises an increase of the transmission repetition quantity for the RAR message.

In some embodiments, the processing circuitry is further configured to identify the UE as a device operating in a coverage constrained mode or a device comprising coverage constrained capabilities based, at least in part, on an expiration of a timer prior to receiving data or a buffer status report (BSR) from the UE via an uplink grant resource identified in the RAR message. In some embodiments, the modified transmission parameter comprises an increased repetition quantity for the transmission of the RAR message to the UE. In some embodiments, at least one of the downlink subframe resource elements allocated for the RAR message is to differ for a plurality of the repeated transmissions of the RAR message.

In some embodiments, the downlink subframe resource elements allocated for a repeat transmission of the RAR message do not comprise a Physical Downlink Control Channel (PDCCH) resource element. In some embodiments, the RACH preamble comprises a physical random access channel (PRACH) preamble received via a PRACH. In some embodiments, the modified transmission parameter comprises a transmission offset such that RAR message is to be transmitted more than a pre-defined quantity of subframes after the RACH message from the UE is received. In some embodiments, the RAR message is addressed to the UE via a random access radio network temporary identity (RA-RNTI) associated with the UE. In some embodiments, the eNodeB further comprises one or more antennas, and the transceiver circuitry is further configured to receive and transmit data via the one or more antennas.

Some embodiments describe a processor comprising a user equipment (UE) identification unit to identify a UE as a device operating in a coverage constrained mode or a device comprising coverage constrained capabilities based, at least in part, on a random access channel (RACH) preamble included in a RACH message received from the UE, and a message generation unit to generate a random access response (RAR) message and an associated transmission parameter, the RAR message to be transmitted to the UE as a response to the received RACH message, the transmission parameter to comprise at least one of a transmission repetition quantity for the RAR message, or downlink subframe resource elements allocated for the RAR message.

In some embodiments, the modified transmission parameter comprises the downlink subframe resource elements allocated for the RAR message, and the message generation unit is to further change one or more of the downlink subframe resource elements allocated for the RAR message to a repeat transmission of the RAR message.

In some embodiments, the UE identification unit is to further identify the UE as a device operating in a coverage constrained mode or a device comprising coverage constrained capabilities based, at least in part, on an expiration of a timer prior to receiving data or a buffer status report (BSR) from the UE via an uplink grant resource identified in the RAR message. In some embodiments, the modified transmission parameter comprises an increased repetition quantity for the transmission of the RAR message to the UE. In some embodiments, at least one of the downlink subframe resource elements allocated for the RAR message is to differ for a plurality of the repeated transmissions of the RAR message.

In some embodiments, the downlink subframe resource elements allocated for a repeat transmission of the RAR message do not comprise a Physical Downlink Control Channel (PDCCH) resource element.

Some embodiments describe a non-transitory computer-readable storage medium that stores instructions for execution by one or more processors of an eNodeB to perform operations to configure the eNodeB to receive a random access channel (RACH) message from a user equipment (UE), the RACH message including a RACH preamble, identify the UE as a device operating in a coverage constrained mode or a device comprising coverage constrained capabilities based, at least in part, on the RACH preamble, generate a random access response (RAR) message in response to the received RACH message, modify a transmission parameter for the RAR message to enhance a coverage of the UE, the transmission parameter to comprise at least one of a transmission repetition quantity for the RAR message, or downlink subframe resource elements allocated for the RAR message, and transmit the RAR message to the UE according to the modified transmission parameter.

In some embodiments, the modified transmission parameter comprises a transmission offset such that RAR message is to be transmitted more than a pre-defined quantity of subframes after the RACH message from the UE is received.

Some embodiments described a user equipment (UE) comprising reception circuitry configured to receive a random access channel (RACH) preamble from an eNodeB, the RACH preamble to identify the UE as a coverage constrained device, and receive a random access response (RAR) message from the eNodeB via one or more downlink subframe resource elements allocated for coverage constrained devices, and transmission circuitry configured to transmit a RACH message, including the RACH preamble, to the eNodeB, and the RAR message from the eNodeB is received in response to the transmission of the RACH message.

In some embodiments, the RACH preamble is received in a system information block (SIB). In some embodiments, the UE further comprises processing circuitry configured to further identify one or more resource elements in the downlink subframe, including the RAR message, based, at least in part, on the RACH preamble.

In some embodiments, the RACH preamble further identifies the UE as a Machine Type Communication (MTC) UE, and the downlink subframe resource elements are further allocated for MTC coverage constrained devices. In some embodiments, the UE is configurable to operate in accordance with one or more of a plurality of operating modes, including a coverage constrained mode. In some embodiments, the RACH preamble comprises a physical random access channel (PRACH) preamble, and the RACH message is transmitted via a PRACH.

The invention claimed is:
1. An eNodeB comprising:
    transceiver circuitry configured to receive a random access channel (RACH) message from a user equipment (UE), the RACH message including a RACH preamble, and to transmit a random access response (RAR) message to the UE according to a modified transmission parameter; and
    processing circuitry configured to:

identify the UE as a device operating in a coverage constrained mode or a device comprising coverage constrained capabilities based, at least in part, on the RACH preamble; and generate the RAR message including the modified transmission parameter in response to the received RACH message, the modified transmission parameter based on an identification of the UE as the device operating in a coverage constrained mode or the device comprising coverage constrained capabilities, different from a transmission parameter of an RAR message for a device operating in a normal mode or a device free from comprising coverage constrained capabilities and comprising at least one of a transmission repetition quantity for the RAR message or downlink subframe resource elements allocated for the RAR message, wherein the downlink subframe resource elements allocated for a repeat transmission of the RAR message do not comprise a Physical Downlink Control Channel (PDCCH) resource element.

2. The eNodeB of claim 1, wherein the modified transmission parameter comprises the downlink subframe resource elements allocated for the RAR message, and wherein the processing circuitry is further configured to change one or more of the downlink subframe resource elements allocated for the RAR message for the repeat transmission of the RAR message.

3. The eNodeB of claim 1, wherein the processing circuitry is further configured to identify the LIE as requesting a machine-type-communication (MTC) connection, and the modified transmission parameter comprises an increase of the transmission repetition quantity for the RAR message.

4. The eNodeB of claim 1, wherein the processing circuitry is further configured to identify the UE as the device operating in the coverage constrained mode or the device comprising coverage constrained capabilities based, at least in part, on an expiration of a timer prior to receiving data or a buffer status report (BSR) from the UE via an uplink grant resource identified in the RAR message.

5. The eNodeB of claim 4, wherein the modified transmission parameter comprises an increased repetition quantity for the transmission of the RAR message to the UE.

6. The eNodeB of claim 5, wherein at least one of the downlink subframe resource elements allocated for the RAR message is to differ for a plurality of the repeated transmissions of the RAR message.

7. The eNodeB of claim 1, wherein the RACH preamble comprises a physical random access channel (PRACH) preamble received via a PRACH.

8. The eNodeB of claim 1, wherein the modified transmission parameter comprises a transmission offset such that RAR message is to be transmitted more than a pre-defined quantity of subframes after the RACH message from the UE is received.

9. The eNodeB of claim 1, wherein the RAR message is addressed to the UE via a random access radio network temporary identity (RA-RNTI) associated with the UE.

10. The eNodeB of claim 1, further comprising:
one or more antennas, wherein the transceiver circuitry is further configured to receive and transmit data via the one or more antennas.

11. The eNodeB of claim 1, wherein the processing circuitry is further configured to:
generate, for transmission by the transceiver circuitry in response to failure to receive a data or a buffer status report in an uplink grant resource indicated in an initial RAR message, additional copies of RAR messages after a wait time from a RACH subframe in which the RACH preamble is received.

12. The eNodeB of claim 11, wherein:
the wait time comprises an initial number of subframes between an end of the RACH subframe and a start of the initial RAR message, a maximum window size of the initial RAR message, a predetermined number of subframes between an end of the maximum window size and the end of the uplink grant resource and another initial number of subframes.

13. The eNodeB of claim 12, wherein:
the initial number of subframes between the end of the RACH subframe and the start of the initial RAR message is 2 subframes, the maximum window size of the initial RAR message is up to 10 subframes, the predetermined number of subframes between the end of the maximum window size and the end of the uplink grant resource is 4 subframes and the other initial number of subframes is 3 subframes.

14. The eNodeB of claim 1, wherein:
a coverage constrained subframe gap between an end of reception of the RACH preamble and a beginning of an RAR window comprising repetitions of the FAR message is larger than a normal subframe gap between an end of reception of a RACH preamble from a normal UE and a beginning of an RAR window comprising an RAR message to the normal UE.

15. The eNodeB of claim 14, wherein:
the coverage constrained subframe gap is determined based on a latency tolerance and processing capabilities of the coverage constrained UE, the processing circuitry further configured to use different coverage constrained subframe gaps for different categories of coverage constrained UEs.

16. A processor comprising:
a user equipment (UE) identification unit to identify a UE as a device operating in a coverage constrained mode or a device comprising coverage constrained capabilities based, at least in part, on a random access channel (RACH) preamble included in a RACH message received from the UE; and
a message generation unit to generate a random access response (RAR) message and a transmission parameter, the RAR message to be transmitted to the UE as a response to the received RACH message, the transmission parameter to comprise at least one of:
a transmission repetition quantity for the RAR message; or
downlink subframe resource elements allocated for the RAR message,
wherein the transmission parameter is based on an identification of the UE as the device operating in a coverage constrained mode or the device comprising coverage constrained capabilities,
wherein the transmission parameter is different from a transmission parameter of an RAR message for a device operating in a normal mode or free from comprising coverage constrained capabilities, and
wherein the downlink subframe resource elements allocated for a repeat transmission of the RAR message do not comprise a Physical Downlink Control Channel (PDCCH) resource element.

17. The processor of claim 16, wherein the modified transmission parameter comprises the downlink subframe resource elements allocated for the RAR message, and the message generation unit is to further:

change one or more of the downlink subframe resource elements allocated for the RAR message to the repeat transmission of the RAR message.

18. The processor of claim 16, wherein the UE identification unit is to further:
identify the UE as the device operating in the coverage constrained mode or the device comprising coverage constrained capabilities based, at least in part, on an expiration of a timer prior to receiving data or a buffer status report (BSR) from the UE via an uplink grant resource identified in the RAR message.

19. The processor of claim 18, wherein the modified transmission parameter comprises an increased repetition quantity for the transmission of the RAR message to the UE.

20. The processor of claim 19, wherein at least one of the downlink subframe resource elements allocated for the RAR message is to differ for a plurality of the repeated transmissions of the RAR message.

21. A non-transitory computer-readable storage medium that stores instructions for execution by one or more processors of an eNodeB to perform operations to configure the eNodeB to:
receive a random access channel (RACH) message from a user equipment (UE), the RACH message including a RACH preamble;
identify the UE as a device operating in a coverage constrained mode or a device comprising coverage constrained capabilities based, at least in part, on the RACH preamble;
generate a random access response (RAR) message in response to the received RACH message;
modify a transmission parameter for the RAR message to enhance a coverage of the UE, the transmission parameter based on an identification of the UE as the device operating in a coverage constrained mode or the device comprising coverage constrained capabilities, different from a transmission parameter of an RAR message for a device operating in a normal mode or free from comprising coverage constrained capabilities and comprising at least one of:
a transmission repetition quantity for the RAR message; or
downlink subframe resource elements allocated for the RAR message; and
transmit the RAR message to the UE according to the modified transmission parameter,
wherein the downlink subframe resource elements allocated for a repeat transmission of the RAR message do not comprise a Physical Downlink Control Channel (PDCCH) resource element.

22. The non-transitory computer-readable storage medium of claim 21, wherein the modified transmission parameter comprises a transmission offset such that RAR message is to be transmitted more than a pre-defined quantity of subframes after the RACH message from the UE is received.

23. A user equipment (UE) comprising:
reception circuitry configured to:
receive a random access channel (RACH) preamble from an eNodeB, the RACH preamble to identify the UE as a coverage constrained device; and
receive a random access response (RAR) message from the eNodeB via one or more downlink subframe resource elements allocated for coverage constrained devices; and
transmission circuitry configured to transmit a RACH message, including the RACH preamble, to the eNodeB,
wherein the RAR message from the eNodeB is received in response to the transmission of the RACH message and is based on an identification of the UE as a coverage constrained device and is different from an RAR message for a device operating in a normal mode,
wherein a transmission parameter for the RAR message is modified to enhance coverage of the UE, the transmission parameter based on the identification of the UE as the device operating in a coverage constrained mode or the device comprising coverage constrained capabilities, the transmission parameter for the RAR message different from a transmission parameter of an RAR message for a device operating in a normal mode or free from comprising coverage constrained capabilities and comprising at least one of:
a transmission repetition quantity for the RAR message, or
the downlink subframe resource elements allocated for the RAR message,
wherein the RAR message is received according to the modified transmission parameter, and
wherein the downlink subframe resource elements allocated for a repeat transmission of the RAR message do not comprise a Physical Downlink Control Channel (PDCCH) resource element.

24. The UE of claim 23, wherein the RACH preamble is received in a system information block (SIB).

25. The LIE of claim 23, further comprising:
processing circuitry configured to further identify one or more resource elements in the downlink subframe, including the RAR message, based, at least in part, on the RACH preamble.

26. The UE of claim 23, wherein the RACH preamble further identifies the UE as a Machine Type Communication (MTC) UE, and the downlink subframe resource elements are further allocated for MTC coverage constrained devices.

27. The UE of claim 23, wherein the UE is configurable to operate in accordance with one or more of a plurality of operating modes, including the coverage constrained mode.

28. The UE of claim 23, wherein the RACH preamble comprises a physical random access channel (PRACH) preamble, and the RACH message is transmitted via a PRACH.

* * * * *

UNITED STATES PATENT AND TRADEMARK OFFICE
CERTIFICATE OF CORRECTION

PATENT NO. : 9,730,249 B2  
APPLICATION NO. : 14/698105  
DATED : August 8, 2017  
INVENTOR(S) : Jha et al.

Page 1 of 1

It is certified that error appears in the above-identified patent and that said Letters Patent is hereby corrected as shown below:

On the Title Page

In item (54), and in the Specification in Column 1, Line 2, in "Title", delete "ACCCESS" and insert --ACCESS-- therefor In the Claims In Column 15, Line 30, in Claim 3, delete "LIE" and insert --UE-- therefor In Column 16, Line 24, in Claim 14, delete "FAR" and insert --RAR-- therefor In Column 18, Line 40, in Claim 25, delete "LIE" and insert --UE-- therefor Signed and Sealed this  
Twenty-fifth Day of June, 2019

Andrei Iancu  
*Director of the United States Patent and Trademark Office*